INVENTORS
EUGENE C. NAUMANN
PATRICK L. CORBIN

ATTORNEYS

3,406,742
AUTOMATIC FATIGUE TEST TEMPERATURE
PROGRAMMER
Eugene C. Naumann, Newport News, Va., and Patrick L. Corbin, Champaign, Ill., assignors to the United States of America as represented by the Administrator of the National Aeronautics and Space Administration
Filed Aug. 26, 1966, Ser. No. 576,182
10 Claims. (Cl. 165—12)

ABSTRACT OF THE DISCLOSURE

A fatigue testing machine which accelerates testing and includes a furnace used for heating the test specimen which is positioned therein. The sides of the furnace may be opened to enable cool air to be directed over the test specimen. Structure is provided for opening and closing the doors. Mechanism cyclicly loads the test specimen. The heating, cooling and loading of the test specimen is programmed so that the test specimen can be loaded under heated and cooled conditions as rapidly as possible until failure of the specimen. This enables the researcher to gather data on the specimen in the least time possible.

Specification

The invention described herein was made by employees of the United States Government and may be manufactured and used by or for the Government for governmental purposes without the payment of any royalties thereon or therefor.

This invention relates to a fatigue testing system, and more particularly to a fatigue testing device wherein temperature programing in combination with load programming is provided.

With the advent of the supersonic transport program, it has been found that many materials must be tested at ambient ground temperatures, and at temperatures many times the ground temperature. Loads associated with taxiing, take-off and climb occur while the aircraft is at ambient temperatures; however, while the aircraft is cruising at high Mach numbers, the skin and other structural parts will acquire temperatures of 550° F. or above. Accordingly, loads associated with the cruise portion of the flight must be applied to a specimen while at this temperature.

Conventional test equipment may be used to acquire data on materials to be subjected to such use. Existing test equipment, however, has proven to be extremely slow, and to require the constant attention of a technician. In a test program for aircraft with a life of 10,000 flights or more, tests with existing equipment could still be running when the aircraft was flying.

The present invention overcomes these difficulties by providing a programmed temperature cycling device, wherein the specimen can be loaded at high temperatures and thereafter loaded at ambient temperature in the least time possible. This is accomplished by an automated device wherein the constant attention of a technician has been eliminated.

It is therefore an object of the invention to provide a fatigue testing system wherein the program temperature is maintained uniformly across the specimen test section.

A further object of the invention is to provide a fatigue testing system which is automatic, the system being operational from the time it is set in motion until rupture of the specimen occurs or the necessary test procedure accomplished.

Yet another object of the invention is to provide a fatigue testing system whereas testing is accomplished in the least time possible enabling rapid acquisition of the necessary data for a proposed aircraft with a life of 10,000 flights or more.

Another object of the invention is to provide a fatigue testing system wherein the test specimen is cyclicly heated and cooled by a programming device wherein the tested specimen can be loaded under the varying conditions in the least time possible.

These and other objects of the invention will become more apparent upon reading the specification in conjunction with the accompanying drawings.

Basically, this invention relates to a specimen fatigue testing machine for testing a material under ambient and high temperature conditions. The arrangement consists of a furnace which is adapted to receive a test specimen. The furnace has means for heating the specimen whereby loads can be applied to the specimen in the heated and/or heating condition. The furnace is also designed so that portions thereof open to allow ambient air to be blown over the test specimen for cooling purposes. This is accomplished by movable doors pivotally connected to the furnace. Solenoid actuated mechanism associated with the doors, open and close the doors in accordance with the test cycle. The furnace, solenoid and a blower are electrically connected to a programmer which is associated with relays and timing mechanism that causes the furnace to heat the loaded specimen for an interval, the furnace to be shut down and the solenoid and blower to become operated during the cooling phase, the specimen also being loaded under this condition. Thus, the cyclic loading under heated and cooled conditions is continued for the test life of the program or until test specimen failure.

Figure 1:
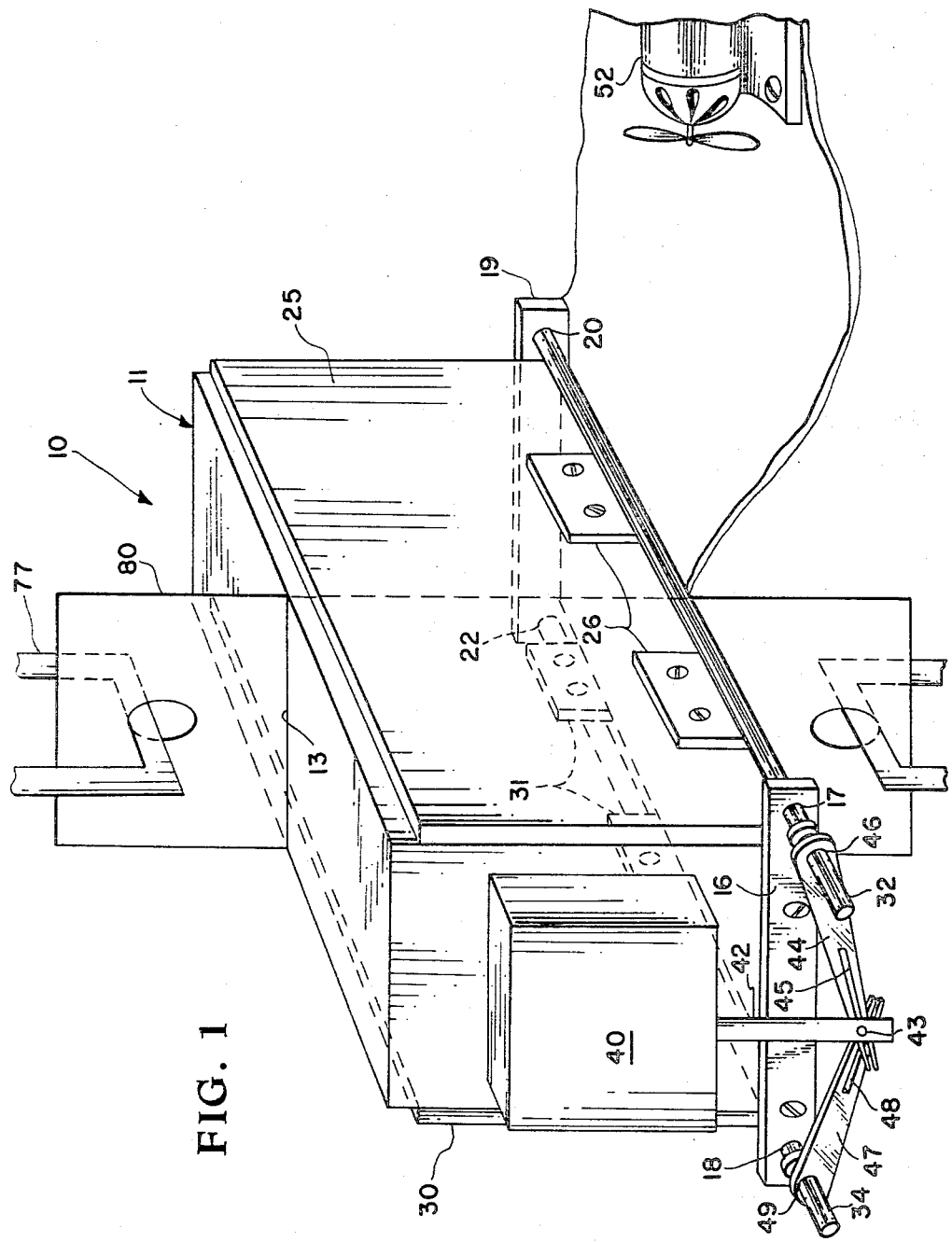
FIG. 1 is a perspective view of the fatigue loading system as shown during the heating portion of the loading cycle.
Figure 2:
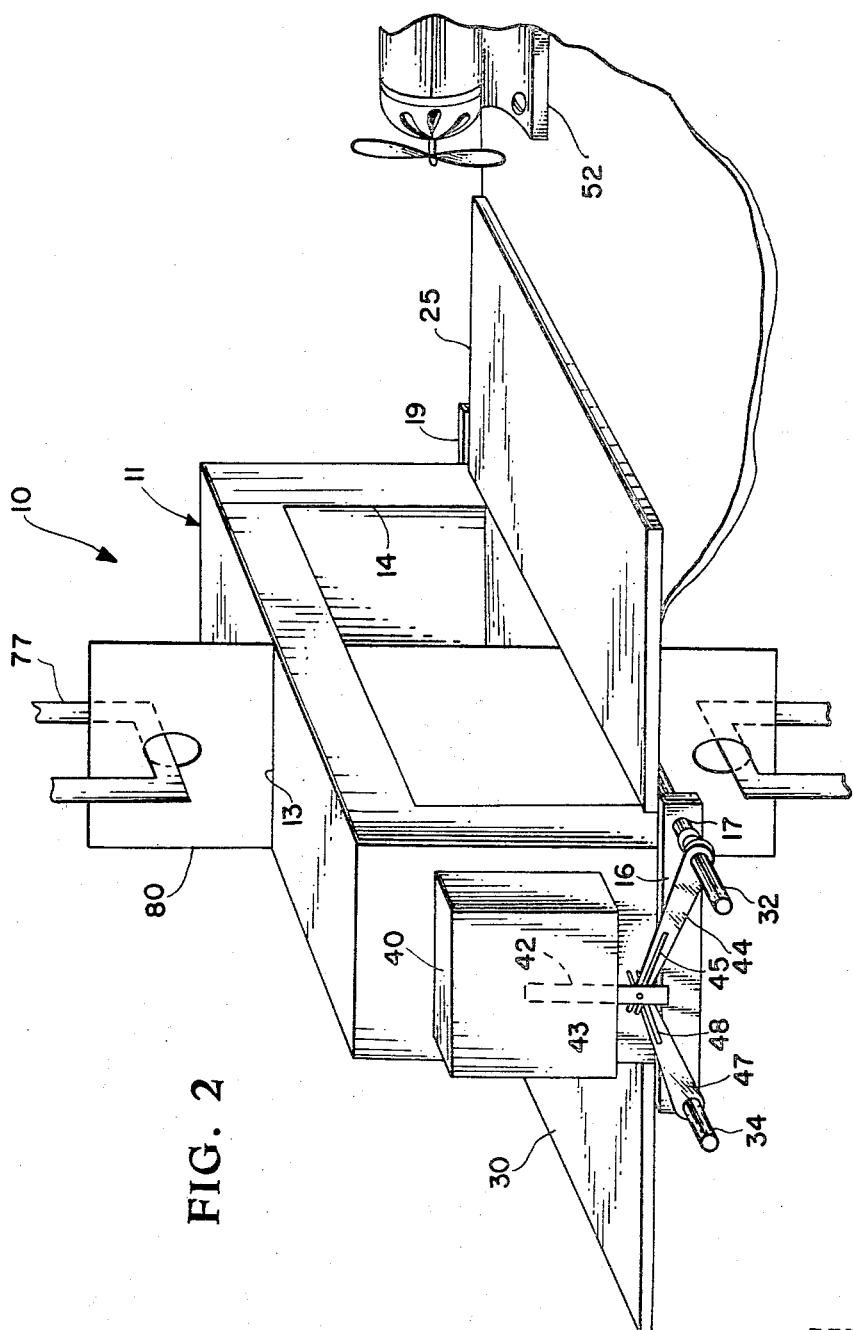
FIG. 2 is a perspective view of the fatigue loading device shown during the cooling phase of the cycle.

Referring now more specifically to the details of the invention FIGS. 1 and 2, show the fatigue testing device designated generally by the reference number 10.

The device includes a furnace 11 which is of a generally rectangular design and is constructed of material that will withstand the heat to which the furnace is to be subjected. A heating element or elements 12 (FIG. 3) of conventional design, are electrically connected to a power source in a conventional manner. These heating elements may be of the resistance type or other commercially available heating arrangements. Opening 13 is formed through the top and bottom of the furnace, approximately midway the ends of the furnace, and is adapted to receive a test specimen. The major portion of the sides of the furnace are cut away to form openings 14 and 14 (FIG. 2) whereby ambient air may be directed over the test specimens.

Fixed to the lower front end of the furnace is a bracket 16 which extends beyond either side of the furnace. The bracket is secured to the furnace in a conventional manner such as by threaded fasteners or by welding. Rod bearing apertures 17 and 18 are drilled or otherwise formed in the bracket portions which are extended beyond either side of the furnace. A bracket 19 of similar design is fixed to the lower rear end of the furnace 11. Rod bearing apertures 20 and 21 are located in the rear bracket portions which extend beyond the sides of the furnace, the aperture 20 alined with aperture 17 and the aperture 21 with the aperture 18.

A door 25 having cleats 26 is located on one side of furnace and door 30 having cleats 31 is located on the other side of the furnace. A rod 32 is journaled in the bracket apertures 17 and 20. The door 25 is fixed to the rod 32 via the cleats 26 in a conventional manner such as by welding. The apertures 18 and 21 receive the other door rod 34 which is also fixed to door 30 via the cleats 31.

Carried by the front end of the furnace 11 is an actuator which in the present invention is a solenoid 40. The solenoid 40 has an operating link 42 with an actuator pin 43 anchored to the end thereof.

A pivot arm 44 is fixed to the rod 32. A slot 45 is cut in the end rod and is of a length and dimension such that the actuator pin 43 of the solenoid link is free to slide in the slot. A similarly shaped pivot arm 47 is fixed to the rod 34 and has a slot 48 which also received the actuator pin 43. It is apparent from the drawings that upon extension and retraction of the solenoid link, the force of the actuator pin 43 will be conveyed to the pivot arms 44 and 47, these arms being fixed to the rods will cause rotation of the rods to open and close the furnace doors 25 and 30.

A cooler which is nothing more than a blower or fan 52 (FIG. 2) is positioned such that ambient air can be blown through the furnace and over the specimen. The blower 52 as well as the furnace and solenoid are tied in with the control system now to be described.

Figure 3:
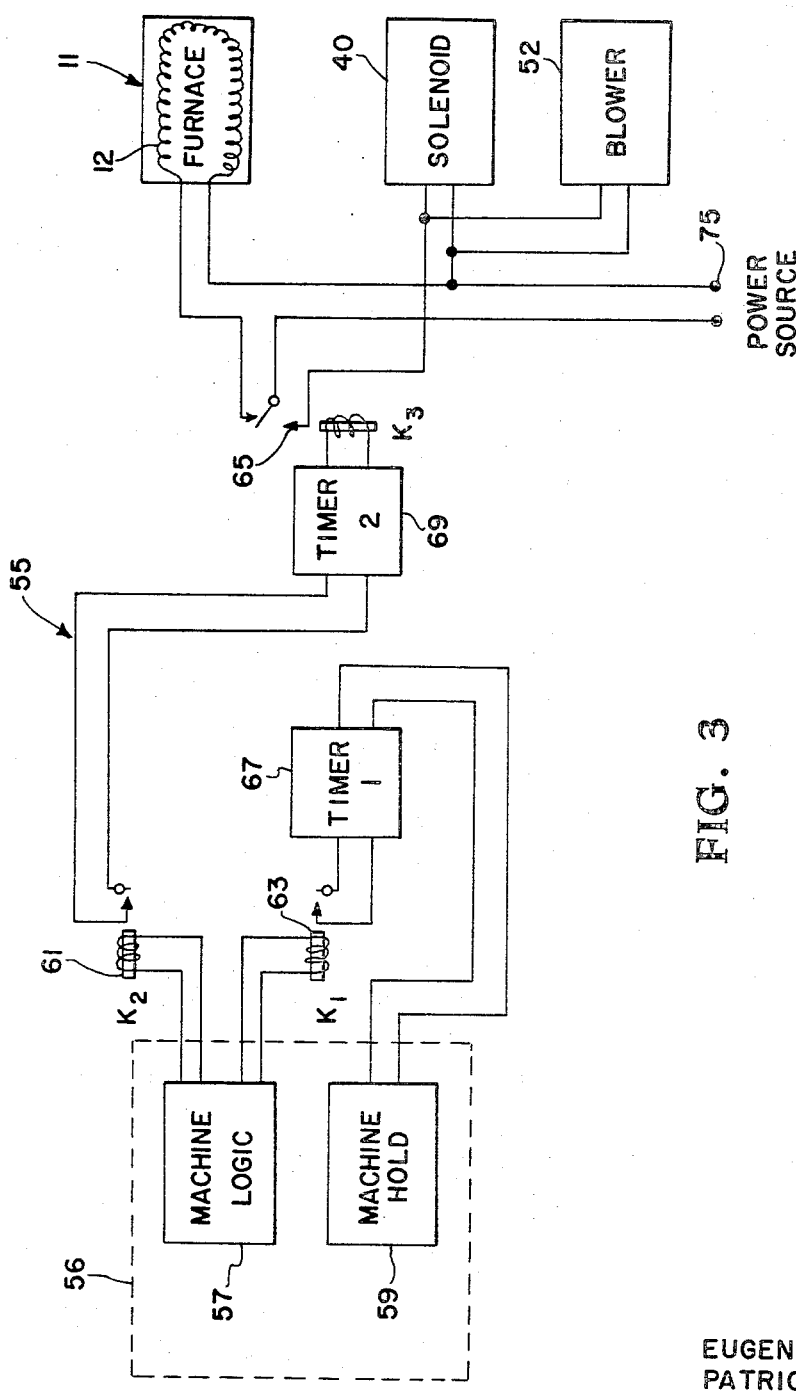
FIG. 3 is a schematic view of the fatigue testing device programmer and control system.

Referring now to FIG. 3, the control system is designated generally by the reference 55. It includes a programmer 56 which is of a design similar to that shown in application Ser. No. 377,777 filed June 4, 1964, entitled, "Fatigue Testing Device." The programmer includes circuitry which is termed for convenience machine logic 57, this mechanism generates an electrical output according to a programmed sequence. The programmer is electrically connected to a relay 61 which is in turn connected to a timer 69. Associated with the timer 69 is a relay 65 having electrical connection with the furnace 11, solenoid 40 and blower 52. The program also has an electrical connection with another relay 63 which is electrically connected to another timer 67 that controls a machine hold arrangement 59. The furnace, solenoid and blower are tied in with a power source 75 in the usual manner.

The test specimen 80 is shown located in the furnace and has apertures which are engaged by load mechanism 77 whereby a load can be placed on the specimen in accordance with testing procedures.

Operation

In operation, the test specimen 80 is located within the furnace as illustrated in FIGS. 1 and 2. The mechanism for loading the specimen is attached and the programmer 56 initiated to start the test procedure.

The test procedure, obviously, depends upon signals which are generated by the programmer. It is to be understood that the program can be taped, and the tape take any number of imaginable variations possible within the limitations of the system.

For example: it will be assumed that the following test procedure is conducted.

A signal is generated by the programmer 56 from the machine logic area 57 which completes a circuit to the relay 61 causing its contacts to close thereby making a circuit to the timer 69 initiating its operation. The timer is of the nature such that it can be set to run for different intervals in accordance with the test procedures to be run. For purposes of illustrations, however, it will be assumed that the timer is set to energize relay 65 for 6.5 minutes, the contacts of the relay being closed so as to make a circuit to the furnace 11. The heating element 12 is thus energized and proceeds to heat the furnace.

Simultaneously with the signal to the relay 61, a signal is sent to the relay 63 closing a circuit to the timer 67. For purposes of example, the timer 67 is set to energize the machine hold 59 for 1.5 minutes. Thus, for 1.5 minutes during the initial heating phase of the furnace the machine hold de-activates the cyclic load portion of the test program. At the end of the 1.5 minutes energization period the timer runs out and a circuit is again completed to the machine hold to restart the cyclic loading of the specimen for the remainder of the heating phase of the test cycle.

After 6.5 minutes of timer 69 has run, the relay 65 breaks contact and makes contact with another terminal of the relay completing a circuit to the solenoid 40 and the blower 52. Energization of the solenoid causes movement of its link 42 and the pin 43 thereof moves in the slots of pivot arms 44 and 47 rotating the door rods 32 and 34. This movement opens the furnace doors allowing ambient air generated by the blower 52 to be directed over the test specimen.

As the timer 69 runs out, the machine logic 57 puts out another signal again energizing relay 63 and timer 67, thus stopping the cyclic loading of the test specimen for 1.5 minutes while it cools. After this lapse of time, the loading and test procedure continues for a 5-minute interval to complete one full cycle.

The above described cycle is repeated, for example 10,000 times, until the test run is completed, or maybe terminated earlier should the test specimen fail.

From the above description of the invention, it is believed clear that a fatigue test can be conducted on a specimen without the necessity of constant attention from a technician or engineer. The testing can be done on a specimen which must be tested at temperatures of several hundred degrees differential in the least time possible. The test specimen can be maintained at a constant temperature throughout loading thereof whether or not the test is being conducted in the high temperature or ambient temperature range. Obviously, the control system is of a practical design wherein the programmer can be set to energize the relays and timers at different intervals and in different manners to facilitate cyclic testing of many types of test specimens. In addition, the timers can be regulated to increase or decrease the loading time as might be required in testing various type specimens under varying load histories. As a result of being able to program loads and temperatures in the invention device, it is possible to properly simulate temperature and loads experienced in supersonic flight. With this system, it is also easier to repeat the test, applying the same temperature, time and loading force in each cycle of the operation. In an arrangement where an attendant is necessary to heat, load and cool the specimen it is almost impossible to maintain consistency of test procedure.

While a preferred embodiment of this invention has been described, it will be understood that modifications and improvements may be made thereto. Such of these modifications and improvements as incorporates the principles of this invention are to be considered as included in the hereafter appended claims unless these claims by their language expressly state otherwise.

What is claimed to be new and desired to be secured by letters Patent of the United States is:

1. A fatigue specimen testing machine or the like comprising: a furnace including means for heating test specimens; means for loading a test specimen located in the furnace; means for cycling said loading means; means for cooling the test specimen in the furnace; and means for automatically starting and stopping cyclic loading under heated or cooled conditions whereby data is acquired in the least time possible.

2. A fatigue specimen testing machine or the like as in claim 1 wherein the side of the furnace open; and motivation means for blowing air through said furnace and over said specimen for cooling.

3. A fatigue specimen testing machine or the like as in claim 1 wherein the furnace carries brackets; a rod rotatably mounted in said brackets on either side of said furnace; doors secured to said rods; and means fixed to said rods for rotating them to open and close the doors.

4. A fatigue specimen testing machine or the like as in claim 1 wherein said motivation means is a blower; said furnace having doors rotatably mounted on either side of said furnace; and solenoid means for opening and closing the doors.

5. A fatigue specimen testing machine or the like as in claim 4 wherein a programmer controls the operation of the furnace and solenoid; said furnace operating during one loading interval and said solenoid and blower being operated together during another loading interval.

6. A fatigue specimen testing machine or the like as in claim 4 wherein a programmer controls the operation of the furnace; solenoid and blower; a first relay energized by said programmer; a first timer started by the closing of said relay; a second relay energized by the starting of said first timer making a circuit to heat said furnace; a third relay energized by said programmer; a second timer started by the closing of said third relay; said second timer terminating said specimen loading for an interval during furnace heating; said first timer upon running out allowing closing of said second relay making a circuit to said solenoid and blower; said programmer again energizing said third relay and second timer to terminate specimen loading for an interval during solenoid and blower operation.

7. A fatigue specimen testing machine or the like as in claim 6 wherein said third relay and second timer is operative during the initial phase of heating or cooling.

8. A fatigue specimen testing machine or the like comprising: a furnace; means for heating a test specimen placed in the furnace; an aperture formed through said furnace for receiving a test specimen; openings formed in the sides of the furnace; doors pivotally mounted on said furnace opening and closing said openings; an actuator mounted on said furnace; leverage system means associated with said actuator and doors for opening and closing the doors; a blower alined with said furnace openings to push air through the furnace and about said test specimen when the doors are open; means for loading a test specimen; and programmer means for cycling heating, cooling and loading whereby said test specimen may be tested under controlled conditions to gather data in the least time possible.

9. A fatigue specimen testing machine or the like as in claim 8 wherein said furnace has brackets; a rod rotatably mounted in said brackets on either side of said furnace; one of said doors being fixed to each of said rods; arms fixed to said rods; slots formed in said arms; said actuator having a link; a pin fixed to said link and engaged in the slots of said arms; said actuator through said link pin and arms rotating said rods to open and close the doors.

10. A fatigue specimen testing machine or the like as in claim 9 wherein a first relay is energized by said programmer; a first timer started by the closing of said relay; a second relay energized by the starting of said first timer making a circuit to heat said furnace; a third relay energized by said programmer; a second timer started by the closing of said third relay; said second timer terminating said specimen loading until the furnace is heated; said first timer upon running out allowing closing of said second relay making a circuit to said actuator and blower; said programmer again energizing said third relay and second timer to terminate loading until said furnace is cooled.

References Cited

UNITED STATES PATENTS

| | | |
|---|---|---|
| 1,967,424 | 7/1934 | Nevitt. |
| 2,006,306 | 6/1935 | Wile. |
| 2,510,952 | 6/1950 | Brewster _____ 165—30 |
| 2,917,871 | 12/1959 | Atkeson _____ 165—12 XR |
| 2,919,119 | 12/1959 | Vyverberg et al. ___ 165—12 XR |
| 3,104,956 | 9/1963 | Gross _____ 165—12 XR |

ROBERT A. O'LEARY, *Primary Examiner.*

M. A. ANTONAKAS, *Assistant Examiner.*